2,922,757

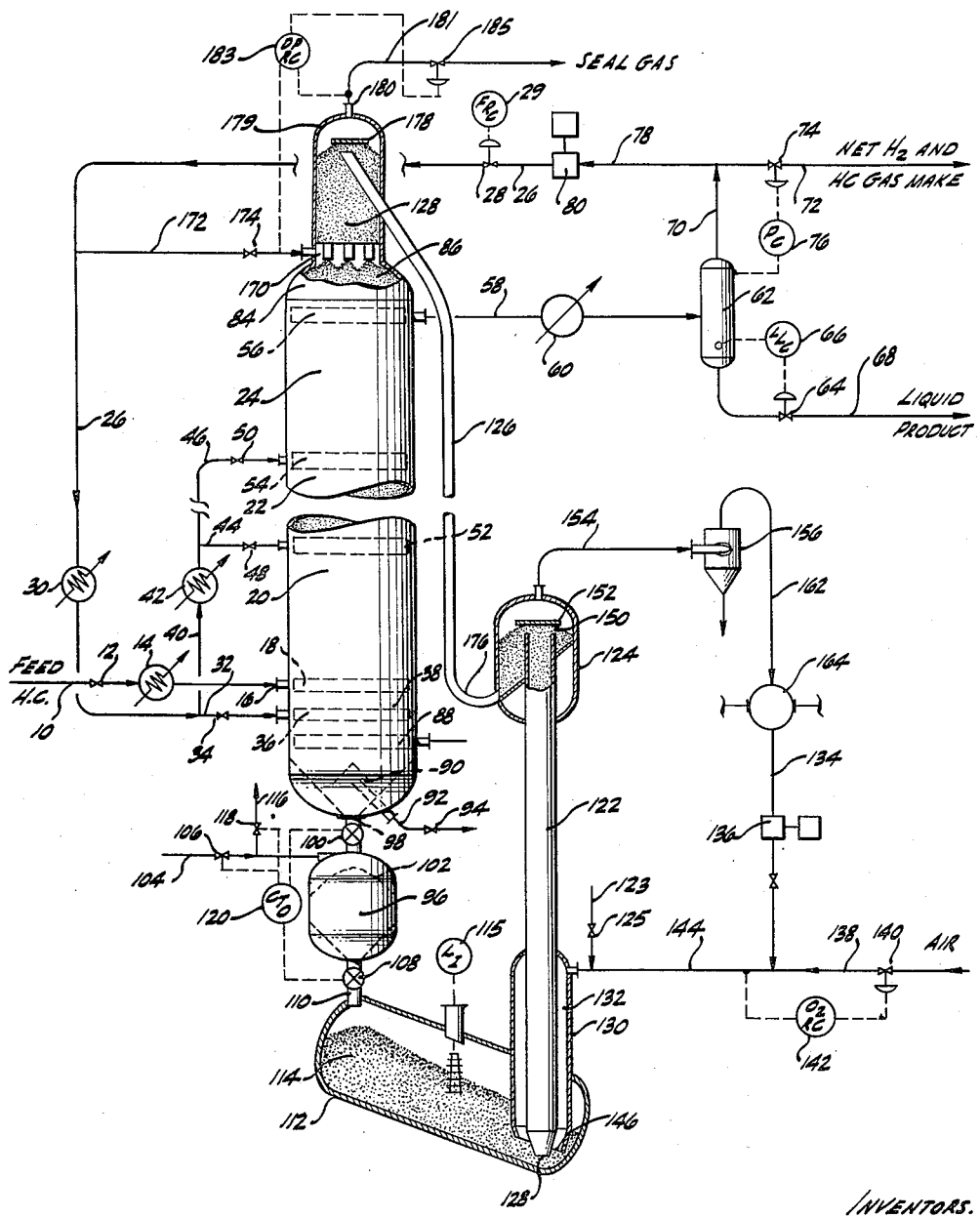
Jan. 26, 1960     R. C. OLIVER ET AL     2,922,757
PROCESS AND APPARATUS FOR SOLIDS-FLUID CONTACTING
Filed Dec. 6, 1955
INVENTORS.
ROBERT C. OLIVER,
CLOYD P. REEG,
BY
ATTORNEY.

PROCESS AND APPARATUS FOR SOLIDS-FLUID CONTACTING

Robert C. Oliver and Cloyd P. Reeg, Long Beach, Calif., assignors to Union Oil Company of California, Los Angeles, Calif., a corporation of California Application December 6, 1955, Serial No. 551,338

16 Claims. (Cl. 208—175)

This invention relates to an improved process for contacting solids with fluids and in particular relates to an improved hydrocarbon conversion process for the upgrading of fuels, solvents, and the like in which the low grade hydrocarbon is contacted directly under hydrocarbon conversion conditions of pressure, temperature and composition with a recirculating mass of solid granular contact material. Specifically this invention is an improvement in those hydrocarbon conversion and other contacting processes in which granular solids are passed downwardly as a moving bed through a reaction zone in contact with fluids to be treated and the spent solids thus formed are completely regenerated in one step prior to introduction into the reaction zone during the passage of the granular solids as a continuous elongated fluid-permeable bed moving upwardly through a conveyance-regeneration zone.

Modern chemical engineering practice includes a great many catalytic and noncatalytic solids-fluid contacting processes for the treatment of solids or the treatment of fluids or both. In many of these processes the contact material does not become spent or deactivated during prolonged use, but in most processes, such as in the catalytic hydrocarbon conversion processes, the contact material degenerates due to the deposit of a hydrocarbonaceous material referred to generally as catalytic coke, and other causes. To continue the process a regeneration or reactivation of the solid material is required and again using hydrocarbon conversion processes as an example this may be done by contacting the spent contact material with an oxygen containing gas.

The description of the present invention is conducted generally with reference to the conversion of hydrocarbons in the presence of solid granular contact material, but it is to be understood that the principles of this invention are not limited only to such processes. They are applicable to other processes in which regeneration of the contact material is required and in which a pretreatment of the thus regenerated material is desirable prior to returning the solid material to the reaction zone.

Hydrocarbon fractions in particular and many other fluid reactant streams in general are advantageously treated under reaction conditions of temperature and pressure in the presence of a solid granular contact material, which may or may not have catalytic activity, to produce fluid products having improved properties. In the field of petroleum refining, hydrocarbon fractions boiling between the limits of about 75° F. and 750° F. and including the light and heavy naphthas or gasolines and the light and heavy gas-oil fractions, are treated at relatively high pressures and temperatures in the presence of solid contact materials to desulfurize, denitrogenate, hydrogenate, dehydrogenate, reform, aromatize, isomerize, or polymerize such hydrocarbon fractions to produce such products having desirable properties which particularly well suit them for hydrocarbon cracking feed, gasoline blending stock, or diesel or jet engine fuels, and the like.

In the particular fields of gas-oil and gasoline desulfurization and in gasoline reforming, the particular chemical reactions involved are conducted at temperatures ranging between about 600° F. and about 850° F. for desulfurization and at temperatures of from about 700° F. to about 1100° F. for reforming. The reactions are usually effected in the presence of a catalyst and between about 500 and about 10,000 s.c.f. (standard cubic feet) of hydrogen recycle gas per barrel of feed. These reactions have been found to be considerably improved by conducting them at elevated pressures ranging from about 50 p.s.i. (pounds per square inch) to about 2500 p.s.i., pressures of the order of between 250 p.s.i. and about 1500 p.s.i. being often used.

In the regeneration of spent hydrocarbon conversion catalysts a separate regeneration zone is employed in those processes in which the granular solid material is recirculated. This regeneration zone may be disposed above or below the reaction zone in a structure which is rather tall and in which the solids gravitate from one contacting zone to the other. The solids must thus be conveyed through a height generally exceeding the total height of the two contacting zones. Furthermore elongated sealing legs are usually required between the contacting zones to permit sealing them one from the other and to permit different pressures of reaction and regeneration and this increases the total height.

To avoid such excessive structural heights, the reaction and regeneration zones are often disposed in separate columns side by side so that the solids must be conveyed from each column to the other to maintain circulation. The same sealing legs are usually required. Although this requires shorter elevators, the total conveyance distance is roughly the same and the solids loss due to attrition is frequently greater since the solids must be picked up and dumped twice per cycle through the whole equipment.

In some particular catalytic hydrocarbon upgrading processes in which the hydrocarbons are desulfurized, isomerized, dehydrocyclized, hydrocracked, denitrogenated, dehydrogenated or reformed or aromatized, using a chromium oxide, molybdenum oxide, or cobalt molybdate catalyst, a third treating process in addition to reaction and regeneration is frequently desirable. This involves the chemical reduction of the catalyst usually with hydrogen immediately following the oxidative regeneration step and immediately preceding further contact of the catalyst with hydrocarbons in the reaction zone. In the two column modification this may require an additional column and an additional conveyor. In the one column modification the addition of this step still further increases the height of the structure. Both of these requirements are undesirable.

In the present invention a novel method for solids conveyance and contacting has been incorporated whereby it has been found possible to eliminate one or two of the contacting columns required previously, and to reduce extensively the height of structure necessary to support equipment for carrying out the process. This structure height has been reduced approximately to the height of the reactor alone. Instead of the extensive conveyance path through which the solids are circulated in the one and two column processes of the prior art, in the process of the present invention the solids per cycle through the system only move downwardly through the reactor and pretreating zones and then upwardly through the regenerator to the beginning point. It is thus apparent that a very substantial reduction, as much as 50%, in the distance through which the solids move per cycle has been achieved and a corresponding substantial reduction in granular solids loss through attrition has also been realized.

It is therefore a primary object of the present invention to provide an improved solids fluid contacting process in which a recirculatory stream of solid contact material moving as a dense moving bed is employed.

It is a more specific object of the present invention to provide an improved hydrocarbon conversion process in which recirculated solid contact material passes downwardly through a reaction zone and then upwardly successively through a regeneration zone as a continuous, dense, moving bed to complete the cycle.

It is a particular object of this invention to provide an improved process for the catalytic upgrading of low grade hydrocarbons in the presence of a recirculating stream of hydrogen and a hydrocarbon conversion catalyst.

It is a specific object of this invention to provide an improved process for upgrading low grade gasolines or napthas contaminated with hydrocarbon derivatives of sulfur whereby the gasoline is desulfurized and aromatized in the presence of a catalyst and a recirculating stream containing hydrogen to produce high grade gasoline blending stocks and in which the spent catalyst flowing from the bottom of the reaction zone is moved upwardly as a dense moving bed through a regeneration zone (in which coke is burned from the spent catalyst forming an oxidized regenerated catalyst) and then upwardly as a dense mass through a conveyance zone in which the regenerated catalyst is conveyed by means of a concurrent flow of the net production of flue gas from the regeneration zone.

It is also an object of this invention to provide an improved apparatus to accomplish the foregoing objects.

Other objects and advantages of the present invention will become apparent to those skilled in the art as the description and illustration thereof proceed.

Briefly the present invention comprises an improved process and apparatus for solids-fluid contacting in the presence of a recirculating stream of granular solid contact material which is passed successively through a reaction zone and then through a regenerationa zone so as to maintain high contact efficiency. The present invention specifically comprises an improved process in which the granular solid contact material is passed from an elevated solids inlet point downwardly by gravity through a contacting or conversion zone maintained under appropriate reaction conditions of temperature, pressure and composition and through which the fluid to be contacted is passed, either concurrently with or countercurrent to the moving solids bed. The fluids are disengaged from the reaction zone after passage therethrough. The spent solid contact material is removed by gravity from the bottom of the reaction zone at a controlled rate and preferably so as to control the flow distribution of the contact material downwardly throughout the entire cross sectional area of the reaction zone.

The spent solids are then passed into a mechanically sealable solids pressuring zone of relatively small vertical extent in which they are either continuously or intermittently pressured to a substantially higher pressure than that maintained in the reaction zone. This may be done by isolating a volume of spent granular material in a pressuring zone and introducing a high pressure fluid so as to raise the pressure of fluids present in the interstices of the solids by an appropriate amount which is substantially equal to the over-all pressure differential existing between the inlet and outlet ends of the associated conveyance-regeneration zone described below. The pressure increase is ordinarily a substantial amount, such as from 25 to 250 p.s.i.g. or more. The actual amount depends upon the physical size of the granular solid contact material, the absolute density of the solid particles, the height of the reaction zone, and the rate of fluid flow.

The pressured solids are then removed from the sealable pressuring zone and passed downwardly by gravity to form a moving accumulation thereof which submerges the lower inlet opening of a vertically elongated conveyance-regeneration zone. A conveyance-regeneration gas is passed into this accumulation, then through the lower inlet opening, and then upwardly through the conveyance-regeneration zone concurrently with an upwardly moving continuous elongated mass of gas permeable granular solids. During this upward movement regeneration or reactivation of the spent granular solids is accomplished. The temperature and pressure and conveyance-regeneration fluid composition are all controlled so as to effect a substantially complete reactivation herein.

The elevation of the solids is continued to a height corresponding to an intermediate point along the length of the reaction column structure. At this point the regenerated granular solids are discharged into an intermediate disengaging zone so as to restrict the discharge of the mass of granular solids from the conveyance-regeneration zone, but wihout any substantial restriction of the discharge of the conveyance-regeneration gas. The major or recycle part of the spent regeneration gas is disengaged from the solids, the solids pass downwardly as a moving bed by gravity with the minor or net product part of the spent regeneration gas into the disengaging zone.

During this second conveyance step the regenerated solids are conveyed by means of the concurrent flow of flue gas produced in the conveyance-regenerator and are introduced directly into the top of the contacting column for subsequent downward passage therethrough. It is thus seen that the regeneration is effected during elevation of the spent solids from the bottom of the reaction zone to the top thereof, no separate conveyance gases or fluids as such are employed, and the solids are moved through the process along a path whose total distance per cycle is not substantially greater than twice the distance downwardly through the reaction zone rather than a path whose length is substantially greater than twice the total distance through the reaction and the regeneration zones.

As above indicated the granular solids move upwardly as a dense mass which is permeable to gas flow in the regeneration and conveyance zones. This is a novel form of conveyance and contacting and in order to accomplish it several essential requirements must be met. These requirements are briefly described below.

The granular solids flow by gravity from the bottom of the column into the conveyance conduit inlet with the conveyance fluid. They are then transferred through the conveyance conduit in compact form by means of the concurrently depressuring conveyance fluid. The frictional forces generated by the conveyance fluid depressuring through the interstices of the fluid permeable compact mass of granular solids generate a pressure or force gradient in the flow direction throughout the entire length of the mass sufficient to counteract opposing forces of friction of the solids sliding against the walls of the conduit as well as the opposing force of gravitation. Hereby movement of the compact porous granular mass in the direction of decreasing conveyance fluid pressure is established and maintained so long as solids are fed at the inlet and removed from the outlet.

The depressuring conveyance fluid generates a pressure drop per unit length of conduit $$\frac{dp}{dl}$$

(sufficient to overcome the opposing gravitational forces ($\rho_s \cos \theta$), wherein $\rho_s$ is the bulk density of the granular solids, and $\theta$ is the angular deviation of the conveyance conduit from an upward vertical reference axis. The ratio of the former to the latter is $$\frac{\frac{dp}{dl}}{\rho_s \cos \theta}$$

This factor is termed the conveyance force ratio and is the ratio of the force tending to move the solids through the conveyance conduit to the opposing forces of gravity tending to restrain such flow. The conveyance fluid must be depressured through the conduit at a rate suffiicient to raise the conveyance force ratio to a value greater than 1.0 (factors in any consistent units) in order that the conveying force exceed the forces resisting flow. The amount by which the conveyance force ratio must exceed a value of 1.0 is equal to the magnitude of the friction forces also tending to resist solids flow and usually approximates 0.1 to 0.3.

The granular solids are maintained during conveyance in compact form at their static bulk density by means of the application of a thrust or solids compressive force on the masss of solids issuing from the outlet of the conveyance conduit. Various means are available for applying such a force which has the effect of restricting the discharge rate of granular solids from the conveyance conduit but has virtually no effect on the discharge of the conveyance fluid therefrom. A transverse thrust plate or a grid or the inner wall of a solids-receiving chamber may be spaced opposite and adjacent the outlet opening, or a static bed of solids may be used to submerge this outlet.

Thus, it is essential that the inlet of the conveyance conduit be kept submerged in a bed of solids to be conveyed, that the conveyance fluid flows through the conveyance zone at a rate sufficient to generate a conveyance force ratio greater than 1.0 throughout the conveyance zone, that means be provided for applying a compacting force against the solids discharging from the conveyance zone, and also that a solids flow control means be provided to regulate the rate at which granular solids are withdrawn from the solids-receiving vessel surrounding the conveyance zone outlet so as to maintain the outlet submerged in a moving bed of discharged solids.

The process of this invention as above described briefly is particularly applicable to the catalytic conversion or upgrading of hydrocarbons in the presence of a recirculated hydrogen stream. The process so applied may involve catalytic dehydrogenation, cyclization, or aromatization and it may also involve catalytic desulfurization and denitrogenation, as well as other familiar hydrocarbon treating and upgrading processes. When the process is so applied, the hydrocarbons to be converted are heated to conversion temperatures and passed through the reaction zone at appropriate pressures in the presence of a hydrogen recycle gas. The hydrogen recycle is then separated from the reaction zone effluent. A portion of this gas is employed to pretreat or reduce the catalyst, the spent contact material comprises a coked or hydrocarbonaceous catalyst, the conveyance-regeneration fluid comprises an oxygen-containing gas such as air, and the conveyance-pretreating fluid comprises a gas containing hydrogen which effectively reduces the regenerated catalyst prior to contact with the reactant hydrocarbon-hydrogen mixture.

Obviously this is only one application of the present invention which is not intended to be limited to this application only. On the contrary it is intended that the process be applicable to any solids-fluid contacting processes in which the separate reaction and regeneration steps are employed.

The present invention and the various modifications thereof will be more readily understood by reference to the accompanying drawing which: illustrates an elevation view in partial cross section of the apparatus in which the contacting process referred to above is carried out, in combination with a schematic flow diagram of the process. The description of the drawing is given by way of example of the process applied in the catalytic upgrading of low grade petroleum naphtha to produce a high quality aromatic gasoline blending stock of substantially reduced sulfur analysis in the presence of a recirculating stream of granular cobalt molybdate catalyst.

The feed naphtha being upgraded in the process of this invention has the following physical properties.

*Table 1*

| | |
|---|---|
| Boiling range, ° F. | 150–400 |
| Gravity, ° API | 52 |
| Sulfur, weight percent | 1.9 |
| Nitrogen, weight percent | 0.015 |
| Knock rating, clear | 62 |

The granular reforming catalyst consists of cobalt molybdate impregnated on 3/16-inch activated alumina granules, it analyzes about 9% $MoO_3$ and 3% $CoO$ by weight. The catalyst is circulated through the column at a rate of 5000 pounds per hour. The preparation of this catalyst may be by any of the methods described in U.S. Patents Nos. 2,369,432, 2,325,033, 2,486,361, if desired, or by other methods.

The feed naphtha having the foregoig properties is pumped by means not shown through line 10 at a pressure of about 425 p.s.i.g. (pounds per square inch gage) and at a rate of 10,000 barrels (42 U.S. gallons per barrel) per day controlled by valve 12 into and through heater 14 wherein it is heated to a temperature of about 900° F. and is vaporized. The naphtha vapor enters inlet 16, is engaged with the downwardly flowing bed of catalyst in feed engaging zone 18, and passes upwardly successively through first reaction zone 20, second reaction zone 22, and third reaction zone 24.

The recycle hydrogen is introduced through line 26 controlled by valve 28 and flow controller 29 into and through recycle gas heater 30. This recycle gas contains between about 50% and about 80% or more by volume of hydrogen. It is heated to a temperature of about 900° F. and is divided into several parts, the primary stream flowing through line 32 at a rate of about 3,000 s.c.f./b. (standard cubic feet per barrel) controlled by valve 34 into primary recycle gas engaging zone 36. The gas is herein engaged with the downwardly moving bed of catalyst, passes upwardly through spent catalyst stripping zone 38 to remove residual naphtha from the catalyst, mixes with the feed naphtha in engaging zone 18, and passes upwardly through the serially connected reaction zones with the naphtha vapor.

Since the dehydrogenation and aromatization of naphtha are essentially endothermic reactions and since the best results are obtained by maintaining closely controlled temperature conditions within the reaction zones, several supplementary streams of recycle hydrogen, each heated to a temperature above the desired reaction zone temperature, are introduced at spaced points between the naphtha inlet and product outlet in the reaction column. Thue the remainder of the hydrogen recycle gas flows through line 40, is further heated to an elevated temperature between about 1000° F. and about 1500° F. in heater 42, and is introduced through lines 44 and 46 at rates of about 1500 s.c.f./b. controlled respectively by valves 48 and 50 into secondary and tertiary hydrogen injection zones 52 and 54. By this means heated hydrogen is admixed with the reactant mixture of naphtha vapor and hydrogen giving up its sensible heat thereto and overcoming the temperature decreases in the reaction zone characteristic of the endothermic reaction. As many injection zones may be used as necessary to keep the reactant gas mixture as close to the desired reaction zone temperature as desired. Usually two or three such injection zones between the reactor inlet and outlet will be sufficient.

The converted hydrocarbon and hydrogen mixture is disengaged from the moving catalyst bed in effluent disengaging zone 56. It passes at a temperature of about 880° F. through line 58 into effluent condenser 60 wherein all but the normally gaseous constituents are condensed. The mixture is then introduced to vapor liquid separator 62 from which the liquid product gasoline is removed at a rate of 9500 barrels per day controlled by valve 64 actuated by liquid level controller 66 and is sent to storage or further treatment through line 68.

The liquid product thus obtained has the following characteristics:

Table 2

| | |
|---|---|
| Boiling range, ° F. | 100–410 |
| Gravity, ° API | 55 |
| Sulfur, weight percent max. | 0.01 |
| Nitrogen, weight percent | 0.001 |
| Knock rating (clear) | 87 |
| Knock rating (3 ml. TEL) | 95 |

The sulfur removal is 99.5%, the nitrogen removal is 93.4%, the boiling range is broadened slightly, the gravity is almost unchanged, and volumetric yield of 400° F. end point $C_4$ free gasoline is the unusually high value of 95% by volume.

The uncondensed materials, consisting essentially of hydrogen and the normally gaseous hydrocarbons, are removed from separator 62 through line 70. The net production of hydrocarbon gases and of hydrogen is removed through line 72 at a rate controlled by valve 74 actuated by pressure controller 76. The gas production from this process amounts to about 1,400 M s.c.f./day and it contains approximately 70% hydrogen and 30% hydrocarbon gases, mainly methane and ethane.

The remainder of the gas phase passes through line 78 into recycle gas compressor 80 wherein the pressure is increased by about 10 to 50 p.s.i.g. or an amount equal to the pressure drop through the reactor and associated exchangers and piping. This high pressure hydrogen is returned through line 26 and is recircuated through the reactor as described above.

To achieve the above mentioned conveyance the catalyst recirculated in this process is passed downwardly through reactor column 84 as a dense moving bed 86. The rate at which the catalyst is recirculated in this process is controlled by reciprocating tray type solids feeder 88 at the bottom of reactor column 84. This is shown here schematically but is well known in the art and described and claimed in U.S. Patents Nos. 2,544,214 and 2,647,587. The spent catalyst moves downwardly with a minor portion of recycle gas hydrogen past seal gas disengaging zone 90. A seal gas comprising a mixture of the hydrogen and flue gas entering via line 98 is removed therefrom via line 92 at a rate controlled by valve 94 which prevents entry of hydrogen into the system subsequently described.

Disposed immediately below reactor column 84 is spent catalyst pressuring chamber 96 into which spent catalyst is introduced intermittently through line 98 controlled by valve 100. With a charge of spent catalyst indicated generally as 102 in chamber 96, valve 100 is closed, and high pressure gas is introduced by means of line 104 controlled by valve 106 to raise the pressure of fluids associated with the solids from about 405 p.s.i.g. to about 445 p.s.i.g. Valve 106 is closed, valve 108 is opened and the pressured spent solids discharged by gravity through line 110 into inclined transfer or inventory vessel 112 forming and maintaining a downwardly moving bed of spent solids 114. Level indicator 115 indicates solids level in 112 and the system solids inventory. Valve 108 is then closed, chamber 96 is then depressured through line 116 controlled by valve 118 to a pressure substantially equal to that in reactor 84, i.e., about 405 p.s.i.g. Valve 100 is then reopened to accept more spent solids and the cycle is repeated at a rate sufficient to pressure the solids at a rate equal to that set by reciprocating solids feeder 88.

If desired and especially at relatively high rates of solids recirculation, a plurality of pressuring chambers 96 may be employed and operated in a staggered sequence so as to permit a substantially continuous spent catalyst withdrawal. The associated control valves are actuated by means of cycle timer operator 120. If desired the pressuring chamber or chambers may be substituted with a continuous rotary solids feeding device of the star feeder type which permits continuous downward passage of solids into higher pressure zones but which prevents counter-flow of fluids.

As indicated briefly above the contacting process of this invention is characterized by the upflow regeneration and conveyance zones through which the spent catalyst is regenerated in the presence of a recycled regeneration gas and conveyed in the presence of a net production of spent regeneration gas in succession while it is being returned to the upper solids inlet of reactor 84. This serially connected system consists of conveyance-regeneration zone 122 and intermediate disengaging zone 124. The granular solids pass as a moving bed in succession through these zones from accumulation 114 to pretreating zone 126 at the top of reactor 84 and during this time the spent catalyst is regenerated to bring it to a state of highest activity.

The lower inlet opening 128 of conveyance-regeneration zone 122 is submerged in moving solids accumulation 114. The lower extremity of the regeneration zone is surrounded by jacket 130 forming therein an annular conveyance-regeneration gas heating zone 132. Recirculated flue gas flowing through line 134 is compressed in compressor 136 from about 405 p.s.i.g. to about 450 p.s.i.g. and is mixed with fresh oxygen flowing through line 138 at a rate controlled by valve 140 and oxygen analyzer controller 142. A conveyance-regeneration gas mixture containing between 0.5% and about 10% oxygen by volume is thus formed and is passed through line 144. This gas passes through direct heat exchange with the regenerating catalyst in regeneration zone 122 while passing through preheating zone 132. This raises the gas temperature to a variable value higher than the coked catalyst ignition temperature which ordinarily is about 500° F. This gas mixture enters moving bed 114 through solids level 146, flows downwardly into solids bed and into opening 128 with the spent solids. The gas flows concurrently with the spent catalyst upwardly through regeneration zone 122 while the coke is burned from the spent catalyst, the regeneration recycle gas oxygen content is depleted, and a net production of spent flue gas is generated. The regenerated catalyst is discharged into intermediate disengaging zone 124.

Of course during start-up and when the coke level on the catalyst is very low, either excess inert gas or a combustible material may be added via line 123 controlled by valve 125 to substitute for or provide, respectively, the net product regeneration gas required to operate line 126 and move the catalyst.

The moving catalyst during regeneration in zone 122 is maintained as a dense compact mass by restricting the discharge of solids from outlet opening 148 and this restriction is effected by the presence of the downwardly moving bed of regenerated catalyst 150 which submerges the outlet opening 148. Baffle plate 152 is provided to apply the solids flow restrictive force and in the event of upset conditions to prevent the discharge of solids through spent regeneration gas outlet line 154. The major or recycle part of the generation gas is disengaged from the solids and flows through line 154 at a temperature of about 1200° F. containing as sensible heat the heat liberated during the regeneration. This gas flows through dust separator 156, and is recirculated through the regeneration zone by passing it through line 162, heat interchanger 164, and then back through line 134 as described. The sensible heat may be recovered in exchanger 164 to preheat the naphtha feed, to preheat the hydrogen recycle gas, or both, etc.

The regenerated catalyst, analyzing less than 0.05% by weight of carbon, passes downwardly as moving bed 150 concurrently with the minor or net product portion of the spent regeneration gas. The catalyst continues downwardly into return bend 176 and upwardly concurrently with the moving mass of regenerated catalyst through conveyance zone 126. The solids are maintained as a moving mass of compact granular catalyst solids by discharging them against thrust plate 178, or against the top of vessel 179, or by other means previously described. The net production of spent regeneration gas is disengeged from the catalyst at this point through outlet 180, passes through line 181 at a rate controlled by differential pressure controller 183 and valve 185 to maintain a predetermined pressure difference across pretreating zone 128. The regenerated catalyst flows downwardly through pretreating zone 128 countercurrent to a hydrogen rich pretreating gas passing upwardly therethrough from engaging zone 170. The pretreating gas comprises a portion of the hydrogen recycle gas, or other hydrogen rich gas, introduced into zone 170 through line 172 at a rate of about 3000 s.c.f./ton of catalyst controlled by valve 174. A minor portion of this hydrogen passes downwardly with the pretreated catalyst as a seal gas into reactor 84 from which it is removed with the effluent via line 58.

Elutriation of fines from the catalyst can be accomplished either at the top of intermediate vessel 124 or of the reactor vessel by controlled disengagement of gases at each of these points.

The foregoing illustrates the application of this invention to the catalytic desulfurization and reforming of a low grade hydrocarbon petroleum naphtha to produce an upgraded solvent or gasoline blending stock. The prior art processes for such hydrocarbon upgrading on a 10,000 barrels per day scale require a superimposed reactor-regenerator-sealing leg combination having a height often of the order of 300 feet. In the two column modification a parallel reactor and regenerator are required together with their sealing legs and this modification has a maximum elevation of from 175 to 200 feet.

In the present invention a reactor having a diameter of about 12 feet and a height of about 60 feet is employed and the regeneration and pretreatment are both effected during conveyance of the spent catalyst upwardly through a path immediately adjacent this reactor column. The structure required for the apparatus of this invention is thus less than 50% as high as the maximum height structure previously required and in addition all sealing legs and catalyst conveyors have been eliminated. A number of additional advantages are also realized and these include a very substantial reduction in power requirement and heat necessary for flue gas recycle compressor 136 because the regeneration zone is also reduced in height. This zone may be of the order of 30 to 50 feet in elevation and have a diameter of between about 10 and about 60 inches or more. A very desirable improvement is also effected in eliminating conveyance fluids by conveying the regenerated catalyst by means of the net product or bleed stream of flue gas since it is discarded from the process and avoids the necessity of using a separate conveyance fluid which must be handled separately. A further advantage is realized in that the volume of the apparatus of the present invention is found to be less than about one-half of the volume of the one column or two column modifications of the prior art for an equivalent operating pressure and feed rate. While this reduction obviously effects substantial savings in structural steel, it also effects a proportionate reduction in the quantity of catalyst inventory necessary to fill and operate the apparatus. Many other advantages and improvements will occur to those skilled in the art upon detailed consideration of this disclosure.

Although the foregoing process and apparatus were described in connection with the desulfurization and reforming of hydrocarbon fractions in contact with cobalt molybdate catalyst in which regenerated catalyst pretreatment was used, it should be understood that the mechanical and process advantages of the apparatus in eliminating separate conveyance fluids by using a reduced height upflow regenerator and conveying with net regeneration gas product may be realized in other processes employing other catalysts and other reactant fluids.

In addition, it should be understood that although other reforming and desulfurization catalysts may be employed in the present invention, cobalt molybdate is the preferred catalyst since it has both desulfurization and reforming activity and thus a given installation may be employed to remove sulfur and nitrogen from either naphtha or gas-oil fractions under certain temperature and pressure conditions, or by changing these temperature and pressure conditions, a petroleum naphtha or other low-grade gasoline may be reformed to reproduce premium-grade internal combustion engine fuels. In the example above, simultaneous aromatization, desulfurization, and denitrogenation were effected with cobalt molybdate catalyst.

In the present invention applied to naphtha reforming and desulfurization, the preferred operating conditions with a cobalt molybdate catalyst are as follows:

*Table 3*

| | |
|---|---|
| Liquid hourly space velocity | 1.0 |
| Catalyst residence time in reactor _____hours__ | 24 |
| Average reactor temperature _____ ° F.___ | 900 |
| Average reactor pressure _____ p.s.i.g.___ | 400 |
| Hydrogen to naphtha ratio, s.c.f. per barrel _____ | 4,000 |

When the process of this invention is applied to the desulfurization and denitrogenation of gas-oil fraction with a cobalt molybdate catalyst the following are preferred operating conditions:

*Table 4*

| | |
|---|---|
| Liquid hourly space velocity | 2.0 |
| Catalyst residence time in reactor _____hours__ | 24 |
| Average reactor temperature _____ ° F.___ | 700 |
| Average reactor pressure _____p.s.i.g.___ | 600 |
| Hydrogen to naphtha ratio, s.c.f. per barrel _____ | 4,000 |

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. In a process for solids-fluid contacting wherein a first fluid is contacted with a solid contact mass in a first contacting zone to produce a product and spent solids, and said spent solids are then regenerated by contact with a second fluid in a conveyance-regeneration zone, the improvement which comprises passing said solids as a moving bed downwardly through said contacting zone in contact with said first fluid, passing spent solids therefrom through a solids pressuring zone to a zone of substantially higher pressure and into a dense accumulation of solids maintained submerging the lower inlet opening of said conveyance-regeneration zone, passing said second fluid concurrently with the solids upwardly therefrom through said conveyance-regeneration zone to regenerate the solids and convey them as a dense mass to an intermediate zone, continuously disengaging from the regenerated solids therein the major portion of spent second fluid, repressuring said major portion of fluid and recycling the same to the inlet of said conveyance-regeneration zone together with fresh regeneration fluid, simultaneously passing the minor portion of said spent second fluid and said regenerated solids upwardly through a second conveyance zone from said intermediate zone, the flow of fluid through each of said conveyance zones being controlled so as to overcome forces of gravity and friction therein and to convey the solids upwardly simultaneously in each of said conveyance zones as a dense continuous mass, disengaging said minor portion of spent second fluid as a net product from the process, and introducing said solids into said first contacting zone for repassage therethrough.

2. In a process for upgrading hydrocarbon fractions which comprises recirculating a stream of catalyst solids successively through a hydrocarbon upgrading zone and a catalyst conveyance-regeneration zone, the improvement which comprises passing the spent catalyst from said upgrading zone into a dense accumulation of catalyst submerging the lower inlet of said conveyance-regeneration zone, passing a regeneration gas through said accumulation and thence upwardly through and concurrently with the dense catalyst mass in said conveyance-regeneration zone to effect regeneration thereof, discharging the regenerated catalyst into an intermediate disengaging zone, continuously disengaging the major portion of spent regeneration gas therefrom, repressuring said major portion of spent regeneration gas and recycling the same to the inlet of said conveyance-regeneration zone together with fresh regeneration fluid, simultaneously passing said regenerated catalyst and the remaining minor portion of said spent regeneration gas upwardly from said intermediate zone through a second conveyance zone to the top of said upgrading zone, separately controlling the flow of gas through said conveyance-regeneration and second conveyance zones at rates each sufficient to generate throughout the upwardly moving catalyst mass in said conveyance zones a pressure gradient sufficient to overcome forces of gravity and friction opposing upward movement of said mass, whereby the catalyst is conveyed upwardly simultaneously in each of said conveyance zones, disengaging said minor portion of spent regeneration gas from the catalyst at the upper end of said second conveyance zone, passing said solids into said upgrading zone, and restricting the discharge of solids at the outlet of each of said conveyance zones so as to prevent fluidization and maintain said catalyst as a continuous mass having substantially its static bulk density and extending throughout both of said conveyance zones.

3. A process according to claim 1 in combination with the steps of passing the regenerated solids from the outlet of said second conveyance zone through a pretreating zone, and passing a pretreating fluid therethrough to pretreat said solids whereby a major part of the pretreating fluid passes through said solids into admixture with said minor portion of spent second fluid to form a seal gas and a minor part passes concurrently with pretreated solids into said first contact zone.

4. A process according to claim 1 wherein said first fluid comprises a hydrocarbon, said spent solids contain a hydrocarbonaceous deposit, and said second fluid comprises flue gas into which an oxygen-containing gas is injected.

5. A process according to claim 4 wherein said solids comprise a hydrocarbon upgrading catalyst.

6. A process according to claim 2 wherein the cross sectional area of said conveyance regeneration zone is substantially greater than that of said second conveyance zone.

7. A process according to claim 2 in combination with the steps of recirculating said major portion of regeneration gas through an external cooling zone to remove and recover heat liberated in the regeneration reactions, injecting into this recycle stream a gas containing oxygen so as to maintain the regeneration reactions and generate additional flue gas, and controlling the withdrawal of said minor portion of regeneration gas at a rate substantially equal to that at which said additional flue gas is generated.

8. A process according to claim 2 in combination with the steps of passing regenerated catalyst downwardly as a dense moving bed through a pretreating zone and then into said upgrading zone, introducing a regenerated catalyst pretreating gas into said pretreating zone, removing part thereof in admixture with the effluent from said upgrading zone, and removing the other part thereof in admixture with said minor portion of flue gas discharged from said second conveyance zone forming a seal gas.

9. A process according to claim 8 in combination with the step of controlling the rate of seal gas removal in accordance with a measured differential pressure across said pretreating zone.

10. A process according to claim 8 wherein said catalyst is selected from the group consisting of molybdenum oxide, chromium oxide, and cobalt molybdate, and said pretreating gas comprises hydrogen.

11. A process according to claim 2 wherein said hydrocarbon comprises a low grade fraction contaminated with hydrocarbon derivatives of sulfur, in combination with the steps of maintaining said upgrading zone at from 600° F. to 1100° F. and from 50 p.s.i. to 2500 p.s.i., and passing between 500 s.c.f. and 10,000 s.c.f. of hydrogen per barrel of hydrocarbon through said upgrading zone.

12. A process according to claim 2 wherein said pressuring zone is mechanically sealable, in combination with the step of introducing a fluid thereinto while sealed to raise the pressure of fluid present in the interstices of said solids by an amount substantially equal to the pressure drop through said regeneration and conveyance zones.

13. An apparatus according to claim 16 in combination with valve means for controlling the seal fluid flow rate from the top of said pretreating chamber, and a differential pressure controller instrument connected to actuate said valve in accordance with the difference in pressure between said means for introducing said pretreating fluid and said seal gas outlet at the top of said pretreating chamber.

14. An apparatus according to claim 16 wherein said means for recirculating fluid includes a fluid cooler through which the recirculating fluid passes from said disengaging chamber and back to the lower inlet of said conveyance-regeneration conduit, and means for introducing a continuous controlled flow of fresh regeneration fluid into the recirculating fluid.

15. A process according to claim 1 in combination with the step of controlling the rate of withdrawal of said minor portion of spent second fluid to correspond substantially to the net amount of fluid produced during said regeneration.

16. An apparatus for solids-fluid contacting which comprises a contacting vessel, inlet and outlet means connected to said vessel for fluid to be contacted, means for maintaining contact conditions of temperature and pressure therein, a superimposed pretreating chamber on said vessel, a solids pressuring vessel connected in solids-receiving relation at the bottom of said vessel and provided with a lower solids outlet, an intermediate fluid-disengaging chamber disposed beside said contacting vessel at an intermediate level with respect thereto, a conveyance-regeneration conduit communicating said lower solids outlet with the top of said disengaging chamber, a conveyance conduit communicating said disengaging chamber with the top of said pretreating chamber, the cross-sectional area of said conveyance-regeneration conduit being substantially greater than that of said conveyance conduit, means adjacent the upper ends of said conveyance conduits for restricting solids discharged therefrom, means for recirculating a conveyance-regeneration fluid upwardly through said conveyance-regeneration conduit, means for removing the major part thereof continuously from said disengaging chamber, means for repressuring said major part and for returning the same to the bottom of said conveyance-regeneration conduit, means for passing the remaining minor part of said conveyance-regeneration fluid upwardly through said conveyance conduit, means for introducing a pretreating fluid at the bottom of said pretreating chamber, and an outlet for a seal gas from the top thereof.

References Cited in the file of this patent

UNITED STATES PATENTS

| | | |
|---|---|---|
| 2,684,930 | Berg | July 27, 1954 |
| 2,689,821 | Inhoff et al. | Sept. 21, 1954 |
| 2,739,994 | Bills | Mar. 27, 1956 |
| 2,743,814 | Berg | May 1, 1956 |
| 2,793,170 | Stiles et al. | May 21, 1957 |